May 15, 1956          J. W. GAW          2,745,206
FISH LURE
Filed Feb. 5, 1954
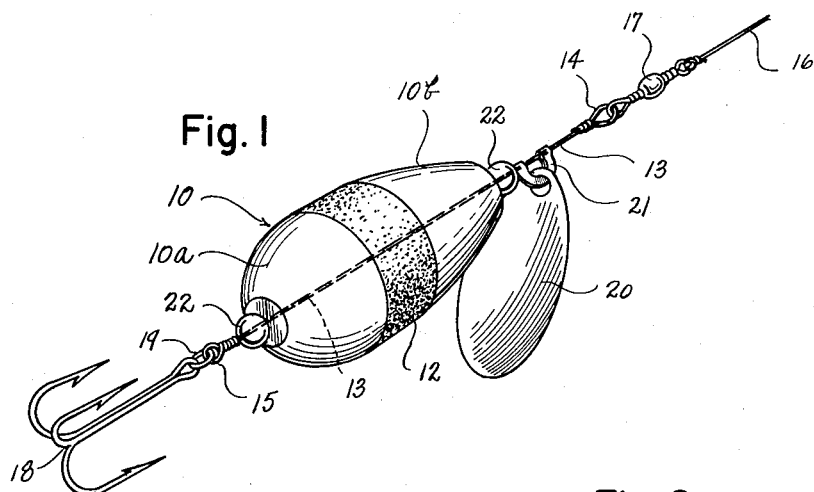
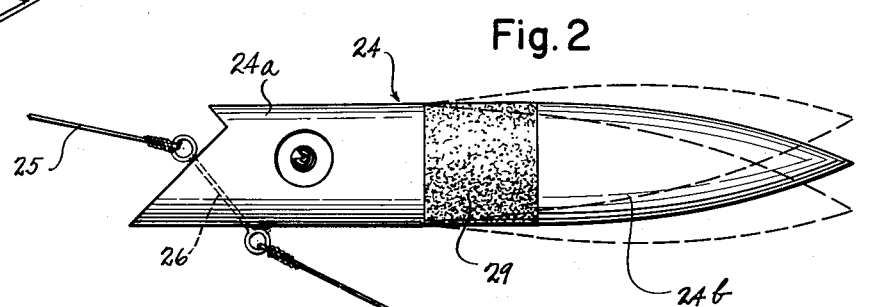
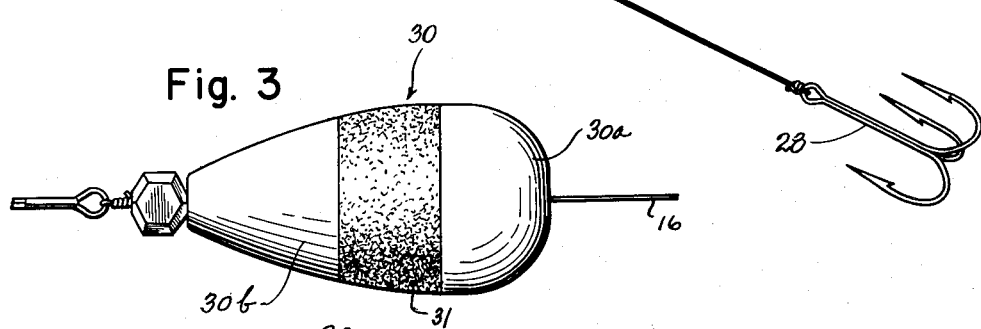
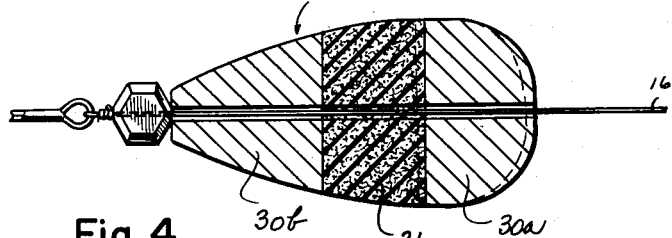
INVENTOR.
J. W. Gaw
BY
Cook & Robinson
ATTORNEYS

2,745,206
FISH LURE

J. Wilson Gaw, Seattle, Wash.

Application February 5, 1954, Serial No. 408,402

3 Claims. (Cl. 43—42.06)

This invention relates to fishing lures, and it has reference more particularly to improvements in lures of "bobber" or plug types which in use are drawn by a line through the water.

It is the principal object of this invention to provide a lure embodying, as a part thereof, an absorbent carrier for a fish oil, or other liquid or solution that will be dissipated from the carrier into the water to attract fish to the lure.

More specifically stated, it is the primary object of this invention to provide a lure in which a carrier for the fish attracting substance which may be a prepared fish oil, or other liquid, comprises a block or section of sponge rubber, or an equivalent material of such size as to be able to absorb a substantial supply of the fish attracting oil and which is of such pliability and is so associated with other parts of the lure that the relative movements of the said other parts will cause it to be so manipulated as to effect a certain desired dissipation, referred to as "milking" of the oil into the water.

Still further objects of the invention reside in the details of construction of the parts comprised in lures of the present type, characterized by the inclusion of the liquid carrying sponge, and in the relationship of the sponge to certain relatively movable parts of the lure whereby the milking or oil dissipating action is effected from influence of the water acting against said parts.

In accomplishing the above mentioned, and other objects of the invention, I have provided the improved details of construction, the preferred forms of which are illustrated in the accompanying drawings, wherein:

Fig. 1 is a perspective view of a fishing lure of "bobber" type embodying the improvements of the present invention therein.

Fig. 2 is a side view of a lure of plug type embodying the improvements of the present invention therein.

Fig. 3 is a side view of a lure of an alternative form equipped with the section of sponge in accordance with the objects of the present invention.

Fig. 4 is a central, longitudinal section of the lure of Fig. 3.

Referring more in detail to the drawings:

The lure of Fig. 1 which I refer to as being one of "bobber" type, is designated in its entirety by reference numeral 10. It comprises the opposite end portions 10a and 10b and an intermediate section 12. Each of these parts, as indicated by their showing in Fig. 1, is round in cross section, and in their assembled relationship, the three parts form a lure body having an elongated egg form.

Extended axially through the assembled parts 10a, 10b and 12, is a wire 13, formed at its opposite ends, respectively, with loops 14 and 15. A fish line, or leader, 16, is connected through the mediacy of a swivel 17 with the loop 14, and treble fish hooks 18 are connected to loop 15 by a ring 19. It is further shown in Fig. 1 that a spinner, or spoon 20 is attached to the wire 13 by means of a U-shaped hanger 21, and that attractor beads 22 are threaded onto the wire at opposite ends of the body.

In threading the various parts of the lure 10 on the wire 13, they are so applied that the part 12 is located between the parts 10a and 10b. These latter parts preferably have flat end surfaces engaged flatly against the opposite end surfaces of the part 12, which also are flat, and the engaged surfaces are glued together. Furthermore, the wire 13 is flexible and the parts 10a, 10b and 12 are axially bored to receive the wire with some clearance so that the parts 10a and 10b are relatively movable, to limited extent, along the wire.

The intermediate section 12 of this lure preferably comprises a section of sponge rubber, or an equivalent material, of a pliable and flexible nature, and adapted to absorb a liquid, such as the prepared fish oil presently being used as the "attractor" substance for fish. The fact that the wire 13 is flexible and that the parts 10a, 10b and 12 are relatively movable makes possible the automatic "milking" action that causes a desired dissipation of the fish attracting substance from the sponge rubber section 12 incident to movement imparted thereto by the force of the water acting against the parts 10a, 10b or other parts of the lure as it is drawn through the water by the line 16.

To use this lure, the user first saturates the sponge 12 by holding it in water and then alternately compressing it between the parts 10a and 10b and allowing it to expand. The free water is finally pressed out of the sponge, and it is caused to be filled or charged with a selected solution or liquid that is attractive to fish. Any suitable substance such as a prepared fish oil can be used so long as it gives off the desired scent or taste to the water as dissipated from the sponge. After the sponge block 12 has been charged, the lure is ready for use. When merely resting in the water, the oil will be slowly and gradually dissipated therefrom, and will flow with the water currents contacting the lure. If action of the lure in the water is such as to cause water pressure against the part 10b to move it toward part 10a, the sponge will be somewhat compressed and a certain amount of the oil caused to be dispersed therefrom. The manipulation of the sponge under influence of the action of the lure in the water causes the water to enter the sponge and the "oil" to be dissipated therefrom.

The lure of Fig. 2, which I refer to as being of "plug" type, is designated in its entirety by reference numeral 24. It comprises forward and rearward end portions, 24a and 24b, respectively. Part 24a has a line or leader 25 attached to its forward end by a wire link 26, and this link carries a leader 27, equipped with treble hooks 28; the link 26 is shown as being extended downwardly through the nose end of the plug.

A sponge rubber section 29 is interposed between and is glued to parts 24a and 24b and joins them. However, by reason of the flexibility of the section 29, the parts 24a and 24b can have relative movement in the water, incident to normal use of the plug, as has been indicated by the dotted line positions in which part 24b has been shown.

The use of the sponge section 29, as shown in Fig. 2, is exactly as that of sponge section 12 of the lure of Fig. 1 and it is adapted to be charged with the fish attracting substance, which I will refer to as "oil" in the same manner.

The lure of Figs. 3 and 4 is substantially like that of Fig. 1, except that wire 13 and the spinner shown in Fig. 1 have been eliminated, and the line or leader 16 here is shown to extend through axially aligned bores in the three parts which make up the lure. This lure is designated in its entirety by reference numeral 30. It is shown to be of "tear-drop" shape, and to comprise the opposite end sections, 30a and 30b and the intermediate section or block 31 of sponge rubber or an equivalent material adapted to absorb a liquid or solution such as the present oil and to dissipate it therefrom under the action of water by that certain manipulation of parts comprising the lure that results from use of the lure in the water. While it is desirable that the sponge section be glued or otherwise secured to the adjacent parts, this is not absolutely essential if the parts are held so closely related that manipulation or relative movement of the members between which it is located, effect the manipulation of the sponge.

The essence of the present invention is not to be confined to specific shapes of parts nor to certain relationships so long as they are consistent with the objects to be attained; the invention, broadly speaking, is based upon use of an absorbent carrier, such as the sponge rubber section, adapted to be charged with a solution, oil or liquid of a suitable character, attractive to fish, and to so apply this carrier in a lure that relative movement of parts comprised in the lure, incident to action of the lure in the water, will effect the automatic "milking" or dissipation of the fish attracting substance into the water.

The device as shown, is attractive as a lure and it is especially effective for its intended purpose.

Having thus described my invention, what I claim as new therein and desire to secure by Letters Patent is:

1. A fish lure of the character described comprising relatively movable opposite end members and an intermediate member, said opposite end members being of buoyant, cork-like material and said intermediate member being of resilient sponge rubber, or the like, adapted to be impregnated with a fish attracting oil for automatic dissipation therefrom by the manipulation of the material as effected by relative movement of said members that result from functional use of the lure.

2. A fish lure of the character described including a length of wire, or the like, serving as an element in a connection between a fishing line and hook, and a bobber threaded onto said length of wire and comprising relatively movable opposite end members and an intermediate member, said opposite end members being of buoyant, cork-like material, and said intermediate member being of resilient sponge rubber, or the like, adapted to be impregnated with a fish attracting oil for automatic dissipation therefrom by the manipulation of the material as effected by relative movement of said members that result from functional use of the lure.

3. A fish lure of plug type comprising a buoyant forward end position equipped for attachment to a line and for attachment of hooks thereto, a buoyant rearward end portion and a section of sponge rubber joining said forward and rearward end portions end to end; said forward and rearward portions be formed from different material than that of the sponge rubber section, said sponge section being resilient and adapted to be impregnated with a fish attracting oil for dissipation therefrom into the water incident to relative movement of the forward and rearward end portions of the lure as effected by action of water in the functional use of the lure.

References Cited in the file of this patent

UNITED STATES PATENTS

| | | |
|---|---|---|
| 716,451 | Mantz | Dec. 23, 1902 |
| 2,129,245 | Stenstrom | Sept. 6, 1938 |
| 2,203,252 | Borneman | June 4, 1940 |